United States Patent [19]

Rogers

[11] Patent Number: 4,730,104

[45] Date of Patent: Mar. 8, 1988

[54] PERIPHERAL VISION GUIDANCE DISPLAY

[75] Inventor: James G. Rogers, Crestline, Calif.

[73] Assignee: Hughes Aircraft Company, Los Angeles, Calif.

[21] Appl. No.: 51,255

[22] Filed: May 7, 1987

Related U.S. Application Data

[63] Continuation of Ser. No. 673,257, Nov. 20, 1984, abandoned.

[51] Int. Cl.$^4$ ............ G06F 15/58; G02B 27/34; F41G 3/00
[52] U.S. Cl. .................................. 235/412; 364/423; 356/145
[58] Field of Search ........ 364/423; 235/404, 411–413; 356/138, 142, 144–148

[56] References Cited

U.S. PATENT DOCUMENTS

| | | | |
|---|---|---|---|
| 3,955,195 | 5/1976 | Greene | 342/136 |
| 3,972,620 | 8/1976 | Nauth | 356/144 X |
| 4,037,959 | 7/1977 | Bumgardner | 356/147 X |
| 4,312,262 | 1/1982 | Tye | 364/423 X |
| 4,367,949 | 1/1983 | Lavering | 356/144 |

FOREIGN PATENT DOCUMENTS

| | | |
|---|---|---|
| 2557038 | 6/1977 | Fed. Rep. of Germany . |
| 748834 | 5/1956 | United Kingdom . |
| 830035 | 3/1960 | United Kingdom . |
| 1153995 | 6/1969 | United Kingdom . |
| 1420746 | 1/1976 | United Kingdom . |
| 1586159 | 3/1981 | United Kingdom . |

*Primary Examiner*—Felix D. Gruber
*Attorney, Agent, or Firm*—Thomas A. Runk; A. W. Karambelas

[57] ABSTRACT

A display is disclosed for indicating in the peripheral vision of a viewer the deviation between the actual position of a target and a reference position such as an aiming point. Light sources are arranged around a common circle which is of a particular size such that when viewed from a particular distance, the viewer sees the display by peripheral vision. There are two sets of light sources, one of which indicates the azimuth and elevation deviations of the target from the aiming point and the other of which may be used to indicate range. The direction of azimuth and elevation deviation is indicated by flashing selected light sources around the circle and the magnitude of deviation is indicated by flashing those light sources at a flash rate indicative of the magnitude. Range is indicated by causing the second set of light sources around the circle to illuminate upon attainment by the target of a certain range.

27 Claims, 5 Drawing Figures

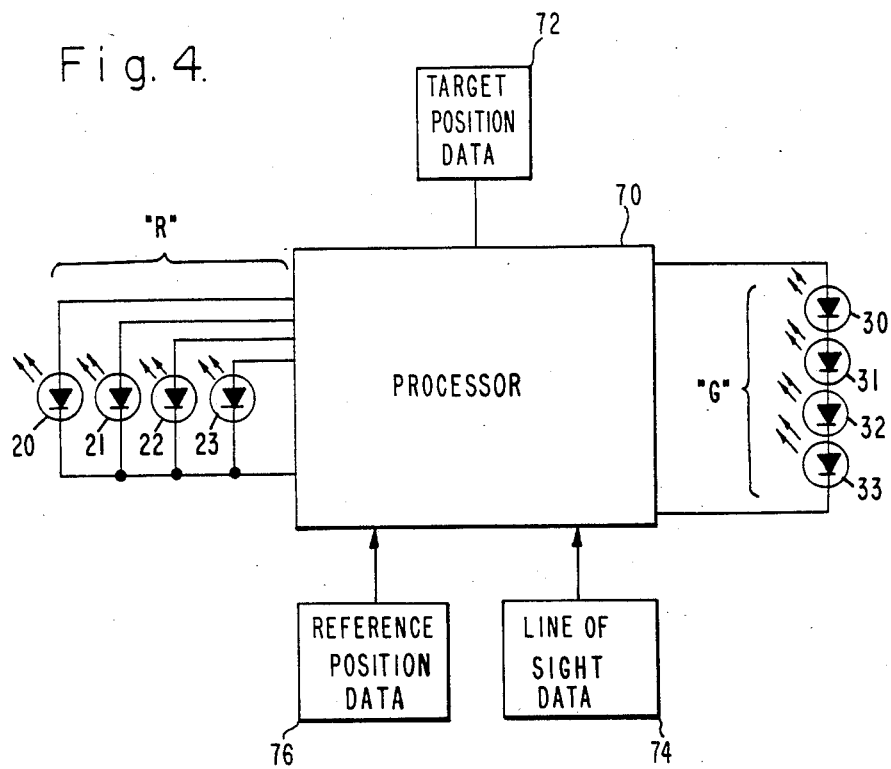
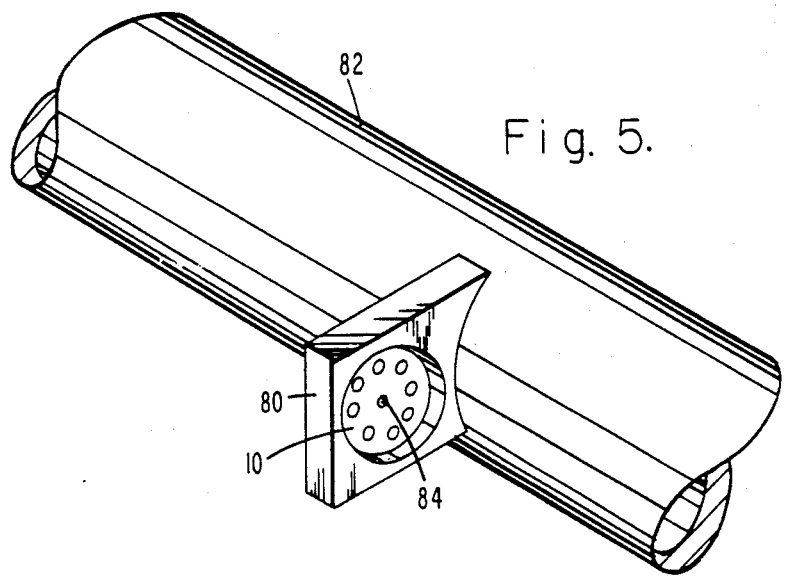

PERIPHERAL VISION GUIDANCE DISPLAY

The Government has rights to this invention pursuant to Contract No. DAAK80-80-C-0789 awarded by the Department of the Army.

This application is a continuation of application Ser. No. 06/673,257, filed Nov. 20, 1984 and now abandoned.

BACKGROUND OF THE INVENTION

The invention relates generally to displays, and more particularly, to a display for indicating the position of a target.

In certain displays for indicating the deviation of a target from a reference line and a reference position, information relating to azimuth, elevation, and range of the target is presented to the user of the display. One well known technique for accomplishing the above is the peepsight which presents azimuth and elevation deviation of the target from the line of sight of the peepsight combined with a front reticle which is used for size estimation of the target to determine its range. The above describes a visual engagement system where the target must actually be seen by the user before accurate aiming can occur. The target and sights are viewed by the foveal vision of the user and comparisons are made between the line of sight of the sights and the target position. Typically, the device upon which the sights are mounted is moved until the target position in relation to the line of sight is within certain azimuth and elevation tolerances.

In conventional gunsights such as the type used in rifles, the eye of the user must not only form an image of the target but must simultaneously form an image of the fork and blade sights mounted at opposite ends of the barrel of the gun. The eye of the user cannot focus clearly on both the target which is usually at a substantial distance, and the elements of the gunsight which are relatively close to the eye of the user. Substantial skill is required for the effective use of this type of aiming device. Also, where cross hair aiming devices are used, they likewise are placed close to the eye of the user whereas the target is at a distance. Visual engagement sights such as those described above are less efficient and may be made unusable in darkness, smoke and fog.

Another well known system for sighting a target is a cathode ray tube ("CRT") display where an aiming symbol is displayed to indicate the position of a target relative to an aiming point or line of sight and to a reference position. The information displayed may be generated by a radar beam which contacts the target or other such means including light beams which are bounced off the target. If the user also desires to visually engage the target, he may have to switch between viewing the CRT display and viewing the target through sights such as those described above. This switching can be undesirable in the case of a high speed target where the target may make large position changes in a relatively short time period. However, visual engagement of the target is required in some cases. A sighting system capable of presenting both the means for visual engagement of a target and the means for the display of electronic tracking data of the same target to a user in a way that the user may receive both simultaneously, i.e., without refocussing his foveal vision, would be desirable.

SUMMARY OF THE INVENTION

With the foregoing background of the invention in mind, it is an object of the invention to provide a peripheral vision display which can be used with a visual engagement sight such that the user can simultaneously view the target position through two systems.

It is also an object of the invention to provide an improved display of target position which can be used in conjunction with a second display and not interfere with that second display.

It is also an object of the invention to provide a display of target position which is usable in darkness, fog, or smoke or in other conditions when visual engagement with the target is difficult or impossible.

It is also an object of the invention to provide a display which is viewed through the peripheral vision of the viewer and which uses light sources to indicate target deviation.

The foregoing objects and other objects of the invention are attained wherein there is provided a peripheral vision guidance display having a plurality of light sources arranged in a circle which selectively emit light to indicate target position in three dimensions. The size of the circle is such that when the user is viewing the display from a predetermined distance, the light sources can be seen in the user's peripheral vision leaving his foveal vision available for other data input.

In one embodiment, four red light emitting diodes (LEDs) are located at 90° intervals around the circle of the display at 0°, 90°, 180°, and 270°. These red LEDs indicate the azimuth and elevation deviation of the target from a reference line such as a line of sight or aiming point which is represented in the display as the center of the circle. When the target is within a certain envelope of the line of sight, all four red LEDs will remain steadily lit. When the target deviates from the line of sight in a direction corresponding to the direction that a red LED deviates from the center of the circle, that LED will flash thus indicating the direction of deviation of the target. When the target deviates from the line of sight in a direction corresponding to a direction which is between two adjacent red LEDs, both of these LEDs will flash thereby indicating that the direction of deviation of the target is somewhere in between.

The magnitude of deviation of the target from the line of sight is indicated by the flash rate of the LED or LEDs. For example, a greater flash rate may be used to indicate greater deviation and a lower flash rate may be used to indicate a lesser deviation.

A third dimension of target position, i.e. range, is indicated by an additional light source or sources which are arranged in the same circle and are placed between the first light sources so that they also may be viewed through the peripheral vision of the user. These additional light sources are of a different color and are used to indicate target attainment of a selected range. In one embodiment, these light sources are four green LEDs equally spaced around the circle and interspaced with the red LEDs. When the target is within a predetermined range, the green LEDs will emit steady green light, otherwise they remain unlit.

BRIEF DESCRIPTION OF THE DRAWINGS

Further features, advantages, and objects of the invention may be understood from the following detailed description taken in conjunction with the accompanying drawings in which:

FIG. 4 is a basic circuit block diagram showing an application of the invention; and FIG. 5 is a perspective view showing an application of the invention.

DETAILED DESCRIPTION OF THE INVENTION

Figure 1:
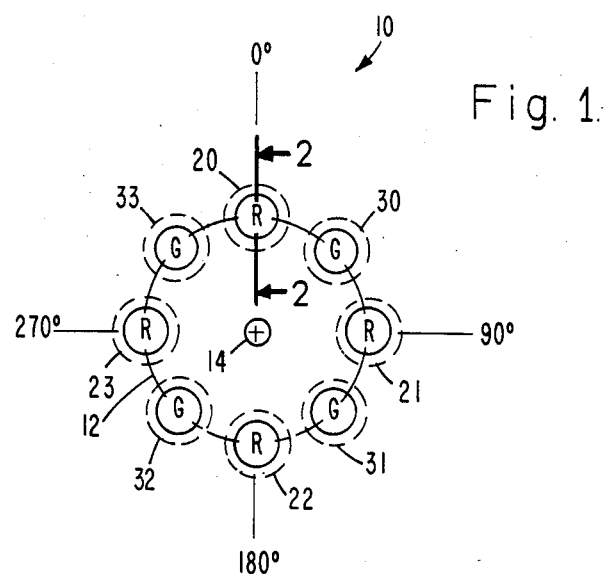
FIG. 1 shows a peripheral vision guidance display in accordance with the invention where light sources are spaced at particular intervals around a circle of a particular diameter.

Referring now to the drawings with more particularity, in FIG. 1 there is shown a display 10 comprising an arrangement of light sources having their centers located on a common circle 12 shown in dashed lines. In the embodiment shown in FIG. 1, there are four light sources 20-23 designated "R" having a common color and four light sources 30-33 designated "G" having a common color which is a different color from the R light sources. The R light sources are spaced at 90° intervals from adjacent R light sources in the circle 12 and in the embodiment shown in FIG. 1, are located at the cardinal directions of 0°, 90°, 180°, and 270° from the center 14 of the circle 12.

In FIG. 1, the center 14 of the circle 12 corresponds to an aiming point or a line of sight and the directions of the R light sources 20-23 in relation to the center 14 are meant to correspond to directions of deviation of a target from that line of sight, i.e., 0°, 90°, 180°, and 270°. As an example, the information displayed by these light sources 20-23 may be used to indicate gunner aiming error. The direction of that error is indicated by a flashing R light source or two flashing R light sources as will be described below. Thus, if the R light source at 180° (light source 22) were flashing, this would indicate that a tracked target is deviating from the line of sight or aiming point in the 180° direction. The aiming point may then be moved towards the flashing R light source 22 to put the target on the aiming point at which time the R light source 22 would cease flashing and remain steadily lit.

In the case where the target position is deviating from the line of sight in a direction corresponding to a direction which is between two adjacent R light sources, those two R light sources will flash in accordance with one embodiment of the invention. For example, if the target position is at a 115° deviation from the line of sight based on the reference orientation of FIG. 1, the R light sources at 90° (source 21) and 180° (source 22) will both flash to indicate that the direction of deviation of the target is intermediate their directions. By moving the line of sight towards the target to cause the line of sight to intercept the target, both of the light sources (21 and 22) will become steadily lit either simultaneously or sequentially depending on whether the target deviation remains at an interim position during the line of sight change. Although the light sources 20-23 are shown in FIG. 1 as being located at 0°, 90°, 180° and 270°, they may be located in other positions and may or may not be spaced evenly from one another, depending on the application. A red light source found to be usable in the invention is the RL-209 light emitting diode (LED) available from Litronix, Inc., 19000 Homestead Rd., Vallco Park, Cupertino, Calif. 95014.

In one embodiment, simultaneously illuminating all the R light sources 20-23 indicates that the target is within a certain distance of the line of sight in all directions, i.e., the magnitude of deviation is less than a predetermined amount. As long as the target position does not deviate from the line of sight by a magnitude greater than the predetermined amount, each R light source will remain illuminated. However, when the magnitude of the target position deviation exceeds that predetermined amount, the R light source or sources which indicate the direction of the excessive deviation will flash. Since the magnitude of the target deviation has not become excessive in the other directions, the remaining R light sources will remain illuminated.

In addition to indicating the direction of the target deviation from the aiming point, the R light sources 20-23 also indicate magnitude of deviation by their flash rate. Since the R light sources are meant to be viewed by the human eye, the flash rate is selected to be within the human perceptual range, approximately 2-8 Hz. In one embodiment, a steadily increasing flash rate indicates an increasing deviation in the target position from the line of sight. An example of one embodiment of the flash rate in relation to magnitude of deviation is given in Table I below.

TABLE I

| DEVIATION | FLASH RATE |
| --- | --- |
| 54°-180° | 8.0 Hz |
| 1.1°-53.9° | 2.5 Hz to 7.9 Hz continuously variable, increasing as the angle of deviation increases |
| 0°-1° | None - Steadily lit |

In accordance with one embodiment, only the R light sources in the direction corresponding to the target deviation from the line of sight flash while the other R light sources remain steadily lit. The deviation angle in TABLE I is based on the line of sight as being 0° deviation. As an example, if the target were at 10° deviation from the line of sight in the 270° direction and at 20° deviation from the line of sight in the 0° direction based on the reference orientation shown in FIG. 1, the R light sources which indicate those deviation directions will flash at rates representative of the magnitude of deviation in their respective directions since, in both cases, the magnitude of deviation exceeds the no-flash envelope established in TABLE I of 1°. Interpolating from TABLE I, the R light source 23 indicating deviation in the 270° direction will flash at an approximate rate of 3.5 Hz, while the R light source 20 indicating deviation in the 0° direction will flash at an approximate rate of 4.6 Hz. The other two R light sources 21 and 22 will remain steadily illuminated. By moving the line of sight towards the target and decreasing the magnitude of deviation, the flashing R light sources (sources 23 and 20) will decrease in flash rate and become steadily illuminated when the line of sight is within 1° of the target. Thus, the R light sources present both the direction and the magnitude of azimuth and elevation deviations.

The remaining light sources 30–33 which are designated G and are located on the common circle 12 with the R light sources 20–23 may be used to display more data such as a third dimension of target position, range. Typically a range point, for example, five miles, is established as a threshold value and upon the target reaching this threshold, the G light sources will be illuminated. This range threshold may be related to an arbitrarily chosen reference position and may indicate that a target is inside, on, or outside a certain range. For example, where the range threshold is to be selected to enable the launching of a defensive missile against a movig target, a dynamic range threshold may be used based on target parameters. The target speed, altitude, and direction may be compared against the engagement capabilities of the missile to establish a launch range. Upon the attainment of that launch range by the target, the G light sources 30–33 will illuminate.

A light source which differs in color from the R light sources 20–23 and is useful in accordance with the invention is a green LED available from Litronix under the Part No. GL-211.

In accordance with the invention, the circle 12 around which the R and G light sources 20–23, 30–33 are arranged as shown in FIG. 1 has a particular size. The display 18 of FIG. 1 is to be of a particular size so that it may be viewed in the peripheral vision of the user, thus leaving his foveal vision free for other uses such as for establishing actual visual engagement with the target. Ordinary tactical visual display devices utilize only the very center of the human visual field, the fovea centralis of the retina. The retinal periphery, on the other hand, through which we normally acquire information about bodily position, velocity and physical threat, is seldom utilized for the input of displayed information. The invention makes specific use of the visual periphery to present positional information for visual tracking in the form to which the visual periphery is most sensitive, i.e., change in position and rate. Because this peripheral signal is cognitively separate from the central foveal visual input, it comprises an additional, non-interactive information channel for the display 10 and thus permits greater diversity on the part of the user.

Figure 2:
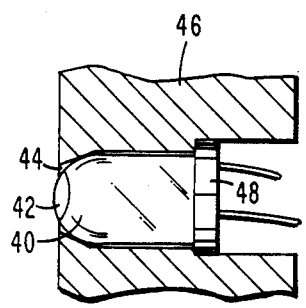
FIG. 2 is a partial cutaway, cross-sectional view of FIG. 1 and shows an installed LED usable in FIG. 1 detailing the size requirements for mounting.

The circle 12 is made to be a size which is proportional to the closeness of the user's eye. However, the smallest size for the circle may be restricted by the light source component size as is shown in FIG. 2. In FIG. 2, a typical LED 40 is shown having the light emitting part 42 visible through an aperture 44 in the mounting structure 46. Although the aperture 44 through which the light emitting part 42 is viewed is relatively small, the mounting flange 48 of the LED 40 is larger and will determine the closeness of adjacent LEDs. Accordingly, the smallest circle results in all eight LEDs as shown in FIG. 1 being in contact at their largest dimension which is usually the mounting flange 48. Since there are eight LEDs in the circle of FIG. 1, each LED therefore will occupy an angle of 45°. The diameter of the smallest centerline circle around which these LEDs may be placed is thus:

$$D = \frac{d}{\sin\left(\frac{45°}{2}\right)} = 2.613d$$

where:

D = the minimum circle diameter, and
d = the LED flange diameter.

For example, the flange diameter of the Litronix RL-209-1 red LED is approximately 40 mm (0.157 inches) maximum; that of the corresponding green LED, GL-211, is approximately 39 mm (0.155 inches) maximum. Calculating the minimum circle diameter from the mean value, we have:

$$D = (2.613)(39.5 \text{ mm}) = 103.21 \text{ mm} (0.408 \text{ inches})$$

Similarly, the inscribed circle (inner LED clearance) is calculated to be D−d=64 mm (0.252 inches) and the circumscribed (outer clearance) circle diameter is 143.26 mm (0.564 inches), in this example.

Figure 3:
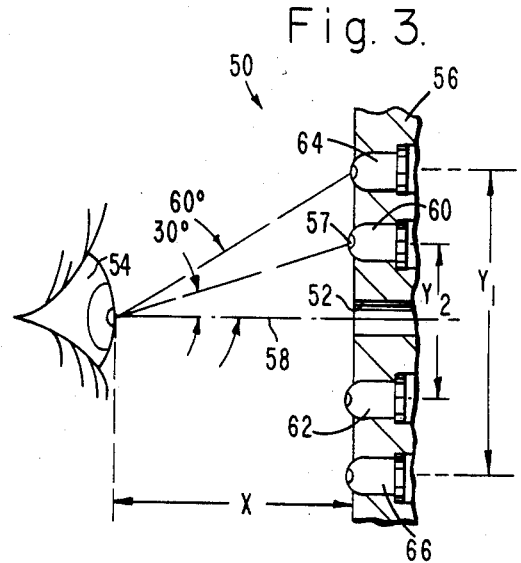
FIG. 3 shows distances and angular offsets in a mounting structure in one embodiment of a peripheral vision guidance display in accordance with the invention.

It has been found that placing the light sources within the range of 30°–60° of the center axis of the eye results in their being seen in the peripheral vision of the average user. An example is given in FIG. 3 where a sight 50 is shown having an opening 52 through which the eye 54 may see for foveal vision engagement with a target. A mounting structure 56 is located around the opening 52 and light sources, which in this case are LEDs, are mounted into it. In this example, the illuminating emitting part 57 of the LEDs do not protrude beyond the mounting structure 56 and are flush with it. The centerline of sight 58 of the eye 54 is shown by the line with double dashes. The inner LEDs 60 and 62 are placed at an offset angle of approximately 30° from the sight centerline 58 while the outer LEDs 64 and 66 are placed at an approximate 60° offset. Where the opening 52 in the display 50 shown in FIG. 3 is a sight for visual engagement, such as a peepsight, the measurement "X" between the eye 54 and the mounting structure 56 which houses the peepsight should be approximately 5 mm (3/16 inch). In that case, the diameter $Y_1$ would be approximately 165 mm (0.65 inches) to give a 60° offset while the diameter $Y_2$ would be approximately 55 mm (0.216 inches) to give a 30° offset. In the example above, the flange diameter of the LED is too large to permit placement of 8 LEDs at the 30° offset. Therefore, one of the considerations in the arrangement of the mounting structure is the diameter of the LED circle since it must be seen in the peripheral vision of the user.

In this example, the centerline circle must be from 55 mm (0.216 inches) minimum to result in a 30° offset to 165 mm (0.650 inches) maximum diameter to result in a 60° offset. However, in the above case where the Litronix RL-209-1 LED was analyzed, the minimum circle diameter is 103.21 mm (0.408 inches) which is approximately 45° where the X distance is 5 mm (3/16 inch). Thus in this example, if an offset angle of 30° is required, the distance X must be lengthened so that the display is further from the eye 54.

In FIG. 4, an application of one particular embodiment of the invention is shown in block diagram form. The R light sources are shown as LEDs 20–23 and the G light sources are also shown as LEDs 30–33. A processor 70 is connected to the LEDs to selectively illuminate them as appropriate. In block diagram form, the processor 70 is shown receiving target position data from block 72, line of sight data from block 74, and reference position data from block 76. In the case of reference position data, the data input to processor 70 from the reference position block 76 is compared to the target position data from block 72 to determine whether or not the target is within a certain range. If the target has crossed the programmed range threshold, the processor 70 applies a potential to the G LEDs 30–33 causing them all to illuminate. The processor 70 may be programmed to dynamically determine a range threshold based on target parameters as discussed above. In the case of line of sight data, this data is input to the processor from block 74 and is compared to the target position data from block 72 to determine the azimuth and elevation deviation of the actual target position from the line of sight. These sets of data are compared and a steady potential or a periodically interrupted potential is applied to selected R LEDs 20–23 to cause them to steadily illuminate or to flash in accordance with the target position relative to the line of sight.

Line of sight data may be input to the processor 70 from a device associated with the sight on which the peripheral vision guidance display is mounted, such as a gripstock compass-inclinometer. Where such a device is used, the transfer function is anticipated to be approximated by the following:

$$F(s) = \frac{K_1 s + 1}{s^2(K_2 s + 1)(K_3 s + 1)}$$

where the two poles derive from the moment of inertia of the device upon which the aiming point is determined and $K_1$, $K_2$, and $K_3$ represent the lag of the compass inclinometer. A compass inclinometer found to be usable is the Model 236 Attitude Sensor from Digicourse, Inc., P.O. Box 50699, New Orleans, La. 70150. This device provides the azimuth position of the line of sight relative to north and provides the elevation position. The response time of this device is claimed to be 0.1 seconds.

Actual target coordinate data may be input to the processor 70 from systems such as a surveillance radar, a three-dimension tracking radar, laser guidance system and other well known systems. The reference position data upon which the range determination is based may be a set of fixed coordinates preprogrammed into the processor 70 upon initial setup or it may be dynamic data such as in the case where the display is mounted in a moving vehicle and the present position of the vehicle is used to establish the reference position and range threshold. Processors 70 are well known in the art and are not described further herein. A general purpose microprocessor such as the RCA-1802 with its supporting chip set is usable for a processor 70 (RCA, Inc., Somerville, N.J.).

An example of an application of the invention is shown in perspective view in FIG. 5. The display 10 in accordance with the invention is mounted in a mounting structure 80. The mounting structure 80 is itself mounted to a device such as a missile launcher tube 82. In this application, the display 10 is used for accurate aiming of the launcher tube 82. A peepsight 84 is also shown and is located in the center of the display 10. The user may establish visual engagement with the target by means of the peepsight. While the user is using his fovea centralis vision for visual engagement through the peepsight, he may also be receiving target position data from the display 10 through his peripheral vision. In the event that visual engagement with the target cannot be accomplished, the user may still accurately aim the launcher tube 82 by means of the display 10.

Although a line of sight has been referred to throughout, this is meant to be an example only and not a limit of the invention. The invention may be applied to a reference line which does not coincide with the line of sight, as in the case where a certain lead distance is programmed into the processor 70 for intercepting the target. Also, although shown throughout as having four R light sources and four G light sources, the amount may vary.

Thus, there has been shown and described a new and useful peripheral vision guidance display. Although embodiments of the invention have been described and illustrated in detail, this is by way of example only and is not meant to be taken by way of limitation. Modifications to the above description and illustrations of the invention may occur to those skilled in the art, however, it is the intention that the scope of the invention should include such modifications unless specifically limited by the claims.

What is claimed is:

1. A display system responsive to target deviation signals indicative of the direction and magnitude of the deviation of the target from a reference position, for displaying the deviation to a viewer, comprising:
   a plurality of light sources arranged in a circle, a point within which substantially corresponds to the reference position, and having a diameter such that the light sources are within the peripheral vision of the viewer positioned at a predetermined distance from the circle; and
   processing means responsive to the target deviation signals for illuminating selected light sources as a function of the direction of deviation of the target and for flashing selected illuminated light sources at a rate which is a function of the magnitude of deviation of the target from the reference position.

2. The display system of claim 1 wherein the processing means illuminates all of the plurality of light sources when the magnitude of deviation of the target from the reference position is less than a predetermined amount.

3. The display system of claim 1 wherein the center of the circle corresponds to the reference position.

4. The display system of claim 1 wherein the processing means illuminates the light source located in a direction from the point inside the circle corresponding to the direction of deviation of the target from the reference position.

5. The display system of claim 4 wherein the processing means illuminates two adjacent light sources when the direction of deviation of the target from the reference position corresponds to a direction from the point inside the circle between the two adjacent light sources.

6. The display system of claim 5 wherein the processing means illuminates all of the plurality of light sources when the magnitude of deviation of the target from the reference position is less than a predetermined amount, and the processing means flashes those light sources located in a direction from the point inside the circle corresponding to the direction of deviation of the target from the reference position.

7. The display system of claim 6 wherein the flash rate of the light sources is within the range of approximately 2 Hz to 8 Hz.

8. The display system of claim 1 also responsive to a target range signal, for displaying the target range to a viewer, comprising:
   at least one light source of a color different than the plurality of light sources and located at a position where it will be within the peripheral vision of the viewer positioned at the predetermined distance from the circle; and the processing means being responsive to the target range signal for illuminating the at least one light source upon the target attaining a predetermined range.

9. The display system of claim 8 wherein the at least one light source is arranged in the circle.

10. The display system of claim 9 wherein the at least one light source comprises four light sources interspaced between the plurality of light sources of the first color.

11. The display system of claim 9 wherein the plurality of light sources comprise four light sources of a first color arranged such that they are equally spaced around a circle and the at least one light source comprises four light sources of a second color arranged such that they are equally spaced around the circle and are interspaced with the light sources of a first color.

12. The display system of claim 11 wherein the first color is red and the second color is green.

13. A display system responsive to target deviation signals indicative of the direction and magnitude of the deviation of the target from a reference position, and responsive to a target range signal for displaying the target position and range to a viewer, comprising:
- a first plurality of light sources of a first color arranged in a circle, a point within which substantially corresponds to the reference position, and having a diameter such that the first plurality of light sources are within the peripheral vision of the viewer positioned at a predetermined distance from the circle;
- at least one light source of a second color located at a position where it will be within the peripheral vision of the viewer positioned at the predetermined distance from the circle; and
- processing means responsive to the target deviation signals for illuminating selected light sources of the first plurality as a function of the direction of deviation of the target and for flashing selected illuminated light sources at a rate which is a function of the magnitude of deviation of the target from the reference position, and also responsive to the target range signal for illuminating the at least one light source of a second color upon the target attaining a predetermined range.

14. The display system of claim 13 wherein the processing means illuminates all of the first plurality of light sources when the magnitude of deviation of the targt from the reference position is less than a predetermined amount.

15. The display system of claim 14 wherein the center of the circle corresponds to the reference position.

16. The display system of claim 15 wherein the processing means flashes the light source of the first plurality located in a direction from the center of the circle corresponding to the direction of deviation of the target from the reference position when the magnitude of deviation exceeds the predetermined amount.

17. The display system of claim 16 wherein the processing means flashes two adjacent light sources of the first plurality when the direction of deviation of the target from the reference position corresponds to a direction from the center of the circle between the two adjacent light sources, when the magnitude of deviation exceeds the predetermined amount.

18. The display system of claim 17 wherein the flash rate increases as the magnitude of deviation increases.

19. The display system of claim 18 wherein the flash rate is within the range of approximately 2 Hz to 8 Hz.

20. The display system of claim 18 wherein the first plurality of light sources comprise four light sources arranged such that they are equally spaced around the circle.

21. The display system of claim 20 wherein the at least one light source of a second color is arranged in the circle.

22. The display system of claim 21 wherein the at least one light source of a second color comprises four light sources arranged such that they are equally spaced around the circle and are interspaced with the four light sources of the first color.

23. The display system of claim 22 wherein the first color is red and the second color is green.

24. A display system responsive to target deviation signals indicative of the direction and magnitude of the deviation of the target from a reference position, and responsive to a target range signal for displaying the target position and range to a viewer, comprising:
- at least four light sources of a first color arranged such that they are equally spaced around a circle, the center of which corresponds to the reference position, and having a diameter such that the at least four light sources are within the peripheral vision of the viewer positioned at a predetermined distance from the circle;
- at least four light sources of a second color arranged such that they are equally spaced around the circle and interspaced with the at least four light sources of the first color; and
- processing means responsive to the target deviation signals for illuminating all of the at least four light sources of the first color when the magnitude of deviation of the target from the reference position is less than a predetermined amount, and for flashing a light source of the first color which is located in a direction from the center of the circle corresponding to the direction of deviation of the target from the reference position, and for flashing two adjacent light sources of the first color when the direction of deviation of the target from the reference position corresponds to a direction from the center of the circle between the two adjacent light sources, the flash rate increasing as the magnitude of deviation increases, and also responsive to the target range signal for illuminating the at least four light sources of the second color upon the target attaining a predetermined range.

25. The display system of claim 24 wherein the at least four light sources of the first color consists of four light sources arranged at 90° intervals around the circle and the at least four light sources of the second color consists of four light sources arranged at 90° intervals around the circle and interspaced with the four light sources of the first color.

26. The display system of claim 25 wherein the first color is red and the second color is green.

27. The display system of claim 26 wherein the flash rate is within the range of approximately 2 Hz to 8 Hz.

* * * * *